United States Patent
Jones et al.

(10) Patent No.: US 8,749,813 B2
(45) Date of Patent: Jun. 10, 2014

(54) METHODS, DEVICES AND SYSTEMS FOR ENCODING GRAPHICAL PRIMITIVES

(75) Inventors: Bruce Jones, Norwich (GB); Angus Duggan, Seattle, WA (US)

(73) Assignee: Global Graphics Software Limited, Cambridge (GB)

( * ) Notice: Subject to any disclaimer, the term of this patent is extended or adjusted under 35 U.S.C. 154(b) by 935 days.

(21) Appl. No.: 12/426,115

(22) Filed: Apr. 17, 2009

(65) Prior Publication Data

US 2010/0073709 A1    Mar. 25, 2010

Related U.S. Application Data

(60) Provisional application No. 61/046,274, filed on Apr. 18, 2008, provisional application No. 61/046,095, filed on Apr. 18, 2008.

(51) Int. Cl.
*G06K 9/48*    (2006.01)
*G06K 9/18*    (2006.01)
*G06K 9/52*    (2006.01)

(52) U.S. Cl.
USPC .......... 358/1.15; 345/630; 345/593; 345/503; 382/241; 382/173; 382/199; 377/10; 358/1.16

(58) Field of Classification Search
USPC ................. 358/1.16; 345/421, 620, 630, 593; 382/113, 173, 241; 715/209, 255
See application file for complete search history.

(56) References Cited

U.S. PATENT DOCUMENTS

| | | | | |
|---|---|---|---|---|
| 3,944,997 A | * | 3/1976 | Swallow | 345/421 |
| 4,183,013 A | * | 1/1980 | Agrawala et al. | 382/173 |
| 4,951,228 A | * | 8/1990 | Hirawa et al. | 345/630 |
| 5,101,436 A | * | 3/1992 | DeAguiar et al. | 382/241 |
| 6,031,544 A | * | 2/2000 | Yhann | 345/620 |
| 6,134,338 A | * | 10/2000 | Solberg et al. | 382/113 |
| 2001/0055124 A1 | * | 12/2001 | Varga | 358/1.15 |

* cited by examiner

*Primary Examiner* — Akwasi M Sarpong
(74) *Attorney, Agent, or Firm* — Bruce E. Black; Lowe Graham Jones PLLC

(57) ABSTRACT

Encoding a graphical element for processing can utilize an edge pair format in which the graphical element is divided into multiple objects, where each object contains exactly two edges which do not cross or self-intersect. Another format is a run-length encoding (RLE) format in which the graphical element is divided into multiple lines, where the RLE format includes an X start position, a Y start position, a length of a first of the lines, and, for each subsequent line, indications of right and left edge steps relative to the immediately proceeding line.

20 Claims, 3 Drawing Sheets

Vector graphic — Flattened graphic — Trapezoids — Raster

Vector graphic — Flattened graphic — Edge pairs

METHODS, DEVICES AND SYSTEMS FOR ENCODING GRAPHICAL PRIMITIVES

CROSS REFERENCE TO RELATED APPLICATIONS

This application claims the benefit of U.S. Provisional Patent Application Ser. Nos. 61/046,274 and 61/046,095, both filed Apr. 18, 2008, the entire contents of which are incorporated by reference.

BACKGROUND

There are a variety of occasions in which a system for printing includes a sequence of graphical elements that is transmitted from one component of the system to another. One example includes a printer driver transmitting page descriptions from a workstation or server computer to a printer (or to a print server). The printer driver may encode the graphical elements into a page description language (PDL). Those in common usage include, for example, Adobe PostScript, Hewlett-Packard's "Printer Command Language" or PCL, Epson Esc/Page, etc. Simpler PDLs may also be used, and can be modified or selected for the capabilities of controllers within the printer with fewer resources or lower power processors.

In another example, the raster image processor (RIP) in a printer may include an interpreter for a PDL running as software on a general purpose CPU, transmitting the sequence of graphical elements to a renderer, which converts those elements into a raster suitable for the marking engine of the printer. The renderer can be implemented in hardware, using one or more FPGAs (field programmable gate arrays), ASICs (application specific integrated circuits) or DSPs (digital signal processors), often combined with one or more standard codecs. This separation allows each part of the whole RIP to be implemented on different processors as desired, and can also enable parallel processing of interpretation and rendering.

The transmission of graphical elements from one component to another can be performed in a number of ways. One example includes serialization into a data stream, which can be transmitted directly from one component to another or may be stored temporarily if desired, e.g. on disk, in RAM or on flash memory (e.g. to allow multiple pages or even multiple documents to be stored between interpretation and rendering on a printer).

A second example utilizes an application programming interface (API), where each graphical element is submitted in turn from one component to another. This second example may enable the easy use of shared memory to reduce the manipulation and copying of some data, such as raster images, at the expense of making longer-term storage of data for multiple pages or jobs more difficult to manage.

The graphical elements can be transmitted in many different forms. At one extreme is an element in a form very similar to that found in the PDL from which it has been parsed and interpreted. At the other extreme is a fully rendered page, or a part of a page. In between is a whole spectrum of formats with varying advantages and disadvantages. For example, simpler forms (i.e. closer to the fully rendered representation) will often require less powerful processing capabilities in the receiving component. This may be important when evaluating the total bill of materials for building the controller board within a printer.

On the other hand, some forms will enable the creation of a more compact data stream, thus increasing the maximum speed attainable when the stream is transmitted over a channel with limited bandwidth, such as a wireless network. In addition, if pages are held in the stream format at an intermediate stage in processing, a more compact stream may require less RAM or hard disk storage space.

In general it takes more processing on the part of the creator component to generate simpler forms, and more work on the receiving component to process more complex forms (closer to the representation within an interpreted PDL). If the component separation is intended to increase or maximize performance through parallel processing it can be important to balance the throughput of each component (taking into account, for example, the capabilities of each component) to reduce the time one component waits for the other component.

Two common formats used for representing data originating as vector elements (text and drawn shapes rather than scanned, painted or photographic images) illustrate two ends of the spectrum. The first common format utilizes graphical elements that resemble those used in common PDLs such as PostScript, which include path building operations such as lines, arcs and Bezier curves, combined with graphics state commands (setting stroke or fill color; stroke width, dash style, end-caps, join styles, etc), and explicit commands to stroke or fill the paths just defined. Streams created in this way are often large (although that is sometimes because the compression options available in the stream are not applied). They also need capable receiving components to process them. It may be difficult to handle a sequence of graphical elements in such a format without the consuming component having access to a general purpose CPU, and it is usually advantageous to also have an FPU (floating point unit). It can also be difficult to deliver guaranteed, bounded rendering times from a high-level stream format like this.

In another common format whole pages, or page regions (either tiles or bands) are rendered into a raster form. These are often compressed using, for example, lossless or lossy methods or combination thereof. As an example, for contone (un-screened) data the use of flate (zip) or JPEG compression is common. For 1-bit (screened) data, the use of CCITT Group 4 or JBIG compression is common. Some compression formats, or variants of formats include comparison of the raster data in one scan line with that in the previous (or next) scan line; this is commonly called "prediction", "differencing" or "delta row".

Streams created as contone raster, even when compressed, are usually significantly larger than an original PDL representation of the same page, and larger than that resulting from the use of many other possible formats. In its favor, a fully rendered raster can typically be processed in a known time for delivery to a print marking engine, and it requires only very simple processing capability in the receiving component.

In related technology, such as accelerated rendering of 3D formats for display on computer monitors, one of two related forms is widely used. In one form, all vector elements can be decomposed to a collection of far simpler objects, sometimes described as graphical primitives. One such is a trapezoid, a four-sided figure, with two parallel sides, aligned with scan-lines in the raster that will be created. The two remaining sides are straight, but may be at any angle. In some cases the top and/or bottom side of the figure may have zero length, making it appear as a triangle or a line with zero width.

Another form uses a representation that is slightly simpler than a trapezoid: a triangle. Conceptually these can be viewed as trapezoids divided diagonally from one corner to another.

Both trapezoids and triangles can be rendered efficiently and rapidly by appropriate consumer components, especially when processed through an API. When serialized into a stream format, however, they do not, form as compact a representation as may be desired. A variety of improvements may be applied to reduce the stream size (e.g. sharing corner points or edges between multiple trapezoids or triangles; or encoding corner positions as deltas from one base corner, enabling fewer bits to be used to store those corners because the dimensions of most elements are not as large as the address space of the band or page). Compression of the stream as a whole can be used to reduce its size, but the rather random nature of something like a page of small text decomposed into trapezoids means that compression ratios achievable with lossless compression are often relatively poor. In addition the requirement to compress and decompress the stream can add processing overhead to both the sending and the receiving components.

Examples of methods for decomposition of vector objects are illustrated in FIG. 1. The "Vector graphic" 101 in FIG. 1 shows a figure with an outline that self-intersects. A vector graphic is a complex structure that is better consumed by a CPU-based implementation than one running solely within an FPGA, DSP or ASIC.

The "Flattened graphic" 102 in FIG. 1 shows the figure where the edges have been split at the highest and lowest points of each curve and have been flattened to sequences of straight lines that can appropriately represent the visual effect of the curve at the resolution at which the page will be printed. (The effect of visual flattening has been somewhat exaggerated in FIG. 1 for visibility; when performed correctly the effect is virtually unnoticeable.) An object in this format can still be somewhat complex to process, as it can have one or more of the following properties: i) be self-intersecting; ii) contain structures in which the left and right sides of one or more segments of the object swap over as the renderer moves down the object; iii) contain an unbounded number of edges (an analysis of representative office documents show that over 3% of such objects contain 16 or more edges); iv) contain an unbounded number of vectors per edge (an analysis of representative office documents show that over 11% of edges contain 15 or more vectors). These properties mean that this form is also better consumed by a CPU-based implementation rather than something constructed purely in hardware.

The upper diagram 103 marked "Trapezoids" in FIG. 1 is an enlargement of the upper right area of the figure in the flattened graphic diagram. Wherever there is a turn point (as a result of flattening) in either of the edges the pair of edges defining this area of the graphic must be split. The horizontal dashed gray lines show how the edges are decomposed into trapezoids with horizontal top and bottom edges, and sloping left and right edges. The lower diagram 104 shows those trapezoids; in this case 18 of them. Trapezoids are an efficient format to deliver through an API, but can lead to a stream being less compact than might be desired.

The raster diagram 105 in FIG. 1 shows that each trapezoid is then rendered further to define exactly which pixels fall within it on every scan line of the output raster to be produced. For clarity the diagram shows only every other pixel span; the white horizontal lines between the black ones would also be marked.

In at least some instances, orthogonal rectangular elements can be treated as a special case and encoded in an extremely compact form in a stream or processed efficiently through an API.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The methods, systems, and devices described herein may be embodied in many different forms and should not be construed as limited to the embodiments set forth herein. Accordingly, the methods, systems, and devices described herein may take the form of an entirely hardware embodiment, an entirely software embodiment or an embodiment combining software and hardware aspects. The following detailed description is, therefore, not to be taken in a limiting sense. The methods described herein can be performed using any type of computing device that includes a processor or any combination of computing devices where each device performs at least part of the process.

Suitable computing devices typically include mass memory and typically include communication between devices. The mass memory illustrates a type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Methods of communication can include both wired and wireless (e.g., RF, optical, or infrared) communications methods and such methods provide another type of computer readable media; namely communication media. Communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Figure 3:
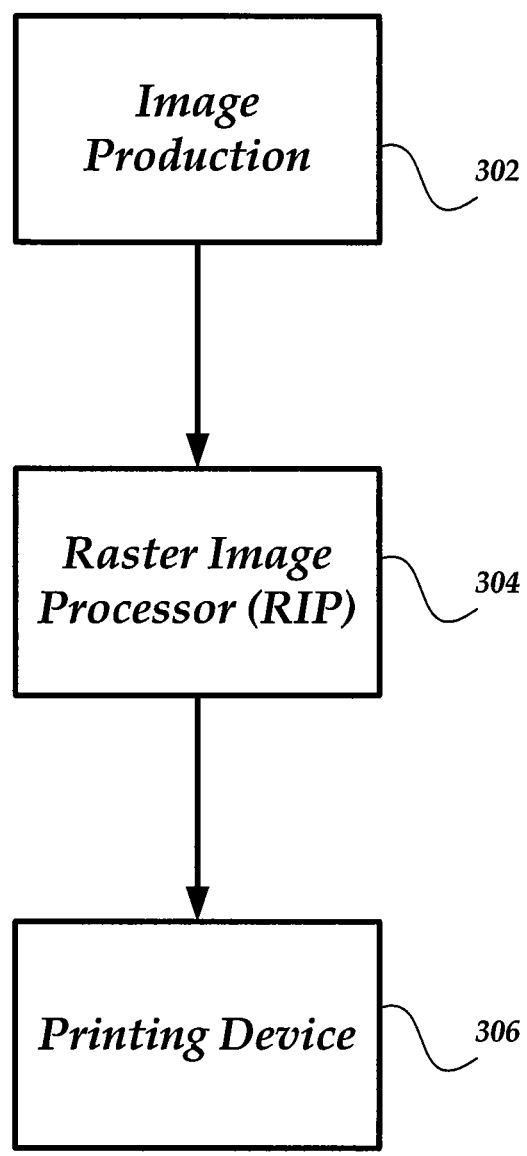
FIG. 3 is a schematic overview for one embodiment of a system for printing, according to the invention.

One example of an arrangement for printing is schematically illustrated in FIG. 3. Each of the components in FIG. 3 can be achieved using hardware, software, or a combination thereof. In addition, the individual components can be separate or combined with one or more of the other illustrated components into a single device. For example, the image production system 302 and raster image processor 304 can be combined on a single computer or the raster image processor 304 can be provided on a computer that controls a printing device 306 or different portions of the raster image processor 304 may be on the image production system 302 and printing device 306 (or even a stand-alone device). The components, individually or in any combination, can include, but are not limited to, a processor, a memory unit, and optionally an input unit. The memory unit can be any suitable storage device selected from removable and non-removable storage devices including, but not limited to, a hard drive, a diskette, a compact disc, a memory stick, random access memory, and the like. The input unit can be any suitable device for inputting information into the component including, but not limited to, a keyboard, mouse, touch-screen, disk drive, memory stick, compact disk drive, and the like.

An image production system 302 produces, procures, or otherwise prepares data (e.g., images, text, photos, graphics, and the like) for printing. The data can be provided as a digital file in any suitable format including, but not limited to, a byte map, or a file in PDL or PCL format. The data is provided to a raster image processor 304 which processes the data to form one or more rasters as described above.

The raster image processor 304 provides the raster(s) to a printing device 306 which then prints the data. The raster(s) can be provided to the printing device as they are being generated, or with a delay, or when the raster(s) are complete. Raster(s) can be provided for each ink of a printing device separately or the rasters of one or more colors can be combined into a single raster using, for example, an interleaved format. When individual rasters for each color are provided to the printing device, these rasters can be provided sequentially or simultaneously (for example, using interleaved or parallel delivery.) The rasters (for example, a page or other object) can be printed on a medium such as, for example, paper, foil, plastic, fabric, metal, wood, ceramic, and the like. The rasters can be printed by any printing method including, but not limited to, ink jet printing, laser printing, flexographic printing, lithographic printing, gravure printing, screen printing, pad printing, and the like.

The formats described herein are useful for transmitting data between components of the printing system. For example, between the image production system 302 and the raster image processor 304 or between the raster image processor 304 and the printing device 306. The formats may also be used for transmitting data between different portions of a component of the printing system, for example, between portions of the image product system 302 or portions of the raster image processor 304 or portions of the printing device 306. It will be understood that all graphical elements in the data need not be processed and described using the same format. A format may be selected as appropriate for each graphical element.

Figure 1:
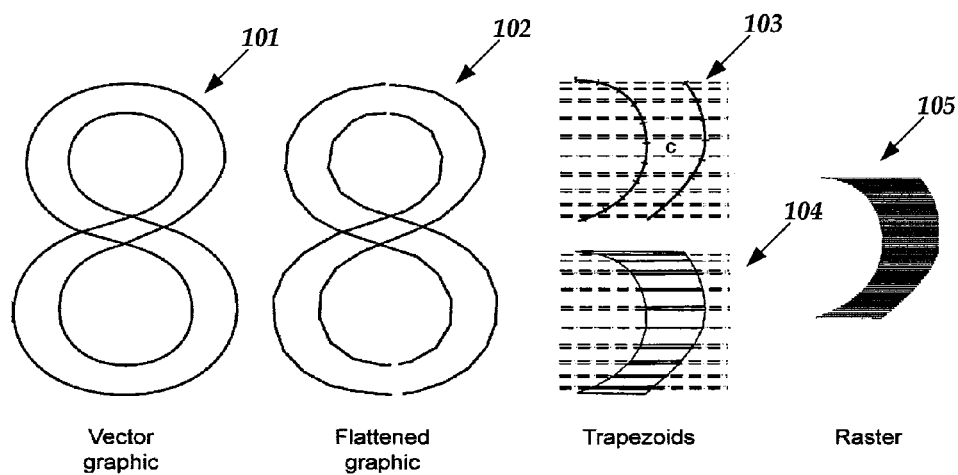
FIG. 1 is a schematic illustration of four formats for encoding a graphical element.
Figure 2:
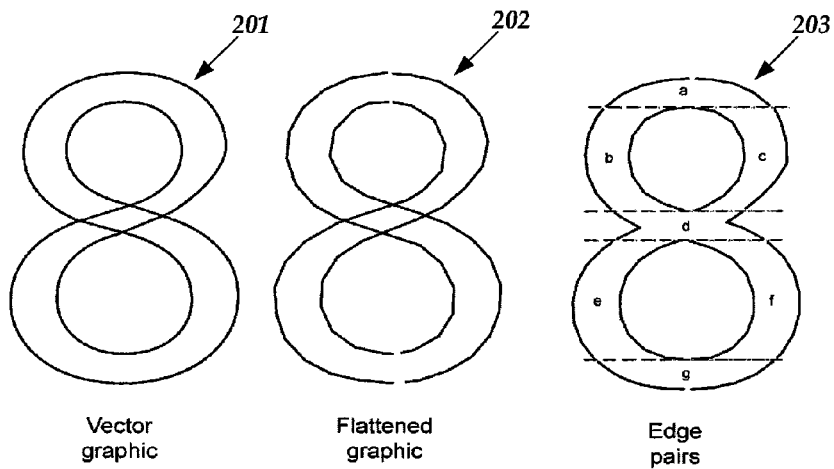
FIG. 2 is a schematic illustration illustrating two known formats for encoding a graphical element and a new "edge pairs" format, according to the invention.

Herein are described two additional formats into which vector objects can be decomposed for transmission. The first of these additional formats can be called "Edge pairs". An edge-pair object 203 is a further decomposition of a flattened object 202, as shown in FIG. 2. The vector graphic 201 and flattened graphic 202 parts of this illustration are the same as those shown in FIG. 1. In this instance the "edge pairs" diagram shows the figure decomposed to seven pairs of edges (labeled 'a' to 'g'). Each edge pair is an area of the figure that is defined only by a single left edge and a single right edge. The break points between successive edge pairs are shown by the horizontal dashed lines. Self-intersection has been removed.

The use of edge pairs removes the possibility of self-intersection or crossing edges (had the edges of any area of the figure crossed, that would have been treated as a break point and that portion of the figure would have been split into two edge pair objects as a result). The number of edges per edge pair object is restricted to two (rather than the unbounded edge count in the regular flattened graphic). An implementation may also choose to limit the maximum number of vectors per edge by splitting very tall edge pairs into two or more separate edge pair objects. Edge pair objects a and g of FIG. 2 illustrate that the outline of a graphical element is divided at its apex and/or nadir to form a left edge and a right edge.

The edge pair objects can be therefore simple enough to implement efficiently in a pure hardware environment with no CPU required. They can also enable a compact stream format where graphical elements have a vertical span greater than a few pixels; all coordinates may be expressed in integer device coordinates (at the resolution at which the page will be rendered). In at least some embodiments, the coordinates of each turn-point for the vectors describing an edge may also be encoded relative to the one above (or the one below) it in the figure. As a result the edge pairs may only require the storage of very small numbers, enabling the use of fewer bits per turn-point than would be required for absolute coordinates.

For some graphical elements, such as smaller graphical elements, the two-dimensional RLE format described below may be more compact. One method of compressing raster data is to apply run-length encoding or RLE to it. This can be moderately efficient for a simple raster of a full page, or a band within a page, particularly if there are not too many photographic images included on that page. It is particularly useful if a raster is delivered element-by-element rather than as the resulting final page.

In simple RLE, a simple graphical shape can be delivered as a series of pixel spans, one or more per scan line in the output raster, depending on whether the object has any features that are vertically concave. Each span is defined by its Y position (the scan line it's on), its X start position (the left-hand end of the span) and its length (in pixels). This can be quite a compact representation, particularly, if simple primitives are used.

A trapezoid 'n' scan lines deep requires i) about 12 bytes if stored as a trapezoid or ii) about 2*n bytes if stored as RLE for each scan line. (Comparisons are made to trapezoid encoding efficiency. Equivalent comparisons could be made to other forms, including "edge pairs".) For objects that cover fewer than about 6 scan lines it is therefore more compact to use RLE than trapezoids. An analysis of a selection of typical office documents prepared for printing at 600 dots per inch (dpi) shows the distribution of trapezoid heights listed in TABLE 1 when all vector objects are encoded as trapezoids.

TABLE 1

Example of Statistical Distribution of Trapezoid Heights in Representative Office Documents at 600 dpi

| trapezoid height | % |
| --- | --- |
| 1 | 48.9% |
| 2 | 20.3% |
| 3-4 | 10.9% |
| 5-8 | 6.6% |
| 9-16 | 4.6% |
| 17-32 | 8.5% |

TABLE 1-continued

Example of Statistical Distribution of Trapezoid Heights in
Representative Office Documents at 600 dpi

| trapezoid height | % |
|---|---|
| 33-64 | 0.0% |
| 65-128 | 0.0% |
| 129-256 | 0.0% |

Thus something around 80% of the time a smaller stream can be created using RLE rather than trapezoids. But it can be made even more compact by generating data in a two-dimensional run-length encoding (RLE2 or 2D RLE).

Consider a trapezoid with sloping edges at left and right. For every subsequent scan line after the top one, the left and right edges will step across by a number of pixels. Rather than storing the Y, X and width data for each span these left and right edge steps could be stored instead.

Figure 4:
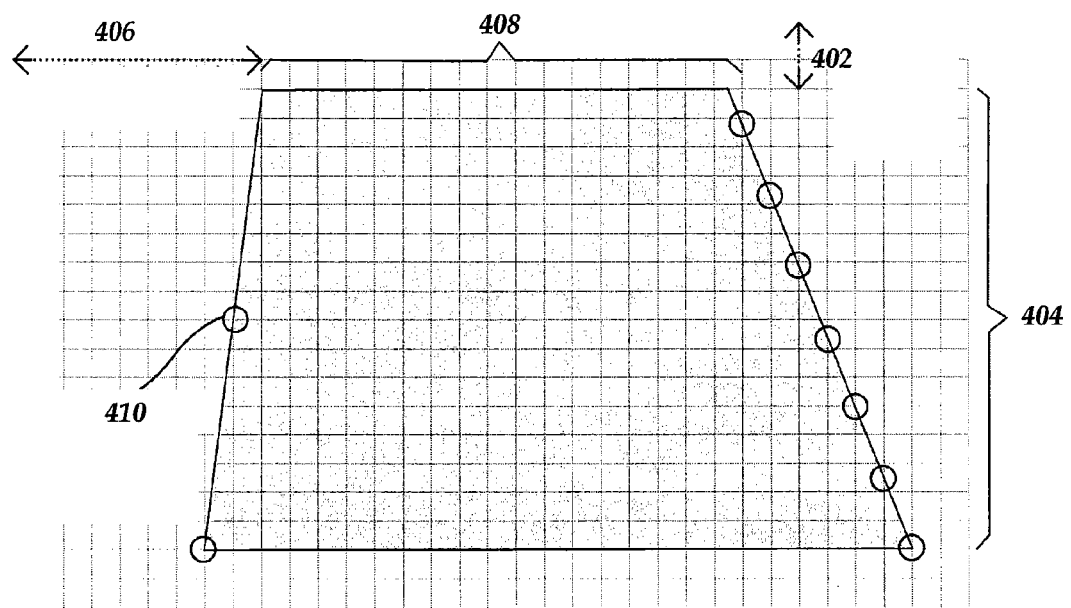
FIG. 4 is a schematic illustration of a trapezoidal element for encoding using a second order or two dimensional run-length encoding (RLE) format, according to the invention.

Then a trapezoid could be equated to a 2nd order RLE object referencing FIG. 4, e.g. something like the following:
 First y scanline=37 (402 in FIG. 4)
 element height=16 (404 in FIG. 4)
 first x coordinate=221 (406 in FIG. 4)
 first run length=17 (408 in FIG. 4)
 left edge x steps=(0,0,0,0,0,0,0,−1,0,0,0,0,0,0,0,−1) #16 steps in total
 right edge x steps=(0,1,0,1,0,0,1,0,1,0,1,0,0,1,0,1) #16 steps in total This is illustrated in FIG. 4, where the grid shows the output raster grid and the trapezoid shape that is to be represented in 2D RLE is outlined. The circles 410 in FIG. 4 represent where edges move by a pixel as indicated in "left edge x steps" and "right edge x steps" above.

Limiting to edges with slopes with absolute edge pair steps of 8 pixels per scan line or fewer (steeper than 7.125°), then each edge step could be stored in a nibble (Nibble RLE2), so the left/right edge pair steps for a scan line could be stored in a byte. If trapezoid edge angles are distributed randomly, this means that 92% of trapezoids could be encoded in this way.

This means a trapezoid 'n' scan lines deep, would use: i) about 12 bytes if stored as a trapezoid, ii) about 2*n bytes if stored as RLE for each scanline, or iii) about 2+n bytes if stored as a nibble-based 2nd order RLE object. Thus a trapezoid 7 scan lines deep would use: i) about 12 bytes if stored as a trapezoid, ii) about 14 bytes if stored as RLE for each scanline, or iii) about 9 bytes if stored as a nibble-based 2nd order RLE object.

A pure trapezoid is only a more compact representation when the object is taller than about 10 scan lines. Given the probability distribution of strip heights as shown above, this is a relatively rare occurrence. Further analysis shows that the great majority of trapezoids with heights greater than 10 scan lines have quite steep slopes: greater than 45°. At these angles all the x steps for the edges would be −1, 0 or +1.

This is not unexpected. If a trapezoid is going to cover a lot of scan lines, then the object that it is decomposed from will typically have relatively few turn points in a relatively tall shape; at any turn point a new trapezoid would be triggered. The only way it can do this (other than in very unusual and simple shapes) is by having steep edges. For example, a circle will typically only have thick trapezoids near the equator, where the edges are steepest, as the flattened arcs at the pole give rise to too many, very shallow, trapezoids.

If all of the edge steps are −1, 0, or +1, and if four object types are defined within the stream or API—1) negative left steps, negative right steps; 2) negative left steps, positive right steps; 3) positive left steps, negative right steps, and 4) positive left steps, positive right steps—then each edge step requires only one bit for storage (0 or 1) (1 bit RLE2). (It will be understood that a fifth category could be a rectangle for which the left and right edge steps are all 0.) The whole object can then be encoded in only 2+(n/4) bytes for an object n scan lines tall, resulting in smaller stream sizes than trapezoids for objects up to 40 scan lines tall.

Thus a trapezoid 20 scan lines deep would use: i) about 12 bytes if stored as a trapezoid, ii) about 40 bytes if stored as RLE for each scanline, iii) about 22 bytes if stored as a nibble-based 2nd order RLE object, or iv) about 7 bytes if stored as a bit-based 2nd order RLE object. Defining additional object types for trapezoids where one edge is steeper than 45° and the other is vertical can increase the compactness still further; those objects would then use only 2+(n/8) bytes per scan line.

Applying these methods to generate a data stream from one page of a representative document (with a distribution of trapezoid heights close to the average) resulted in the following stream sizes. Adding a combination of nibble and 1 bit RLE2, together with special-cases for trapezoids with one vertical edge could reduce the stream size still further.

TABLE 2

Examples of Stream Size Achieved when using Various Encodings

| Compression method | Total stream size |
|---|---|
| Simple RLE | 210 kbytes |
| RLE + Rectangles | 140 kbytes |
| Trapezoids | 109 kbytes |
| RLE + Rectangles + Nibble RLE2 | 79 kbytes |
| RLE when height <6, else Trapezoids | 56 kbytes |
| RLE + Rectangles + 1 bit RLE2 | 34 kbytes |

"Rectangles" refers to orthogonal rectangular elements that can be treated as a special case and encoded in an extremely compact form in a stream or processed efficiently through an API.

If insufficient command codes for the four or eight object types required for 1 bit RLE2 are available, a similar approach using 2 bits per edge per scan line could be used to represent the 3 possible values in each case, thereby using 2+(n/2) bytes per object, resulting in smaller stream sizes than trapezoids for objects up to 20 scan lines tall.

Both of the representations described herein may be used directly in a stream of graphical objects. They may also be used in a variety of situations where a graphical construct is referenced later in processing, including (but not limited to): 1) definition of clipping paths; 2) caches for glyph outlines that can be placed on the page in multiple positions; or 3) cells within patterns that are then replicated. Such replication may include vertical and horizontal reflection.

The addition of "edge pairs" and "two-dimensional RLE" can enhance the efficiency of many cases where graphical object descriptions are passed from one component of a system to another.

Both can be effective at reducing the stream size which may, in turn increase the performance of the system as a whole when the transmission is over a channel with a limited bandwidth, such as IEEE 802.11g wireless networking.

Edge pairs can be transmitted both in a stream form, and passed through a direct API. They are simple enough to be processed very efficiently in hardware, while being complex enough to allow for efficient and rapid generation from unflattened vector objects in a software interpreter. They thus can allow for a better allocation of tasks to the multiple components used in some systems. They can also enable the times taken for software interpretation and hardware rendering to be balanced in those systems where the two are running in parallel, thus avoiding one component spending too much time waiting for the other.

Two-dimensional RLE can be transmitted in an efficient manner both in a stream form and through a direct API. They can be processed in a very simple (and hence low-cost) hardware processor. When delivered to a more complex hardware processor they can be the most compact representation of certain classes of object.

The above specification, examples and data provide a description of the manufacture and use of the composition of the invention. Since many embodiments of the invention can be made without departing from the spirit and scope of the invention, the invention also resides in the claims hereinafter appended.

What is claimed as new and desired to be protected by Letters Patent of the United States is:

1. A method for printing, the method comprising:
   receiving data for printing, the data for printing comprising one or more graphical elements;
   processing at least one of the one or more graphical elements to encode the at least one graphical element for processing using an edge pair format, wherein the edge pair format divides the graphical element for processing into a plurality of non-overlapping objects, wherein each object contains a single left edge of the graphical element for processing and a single right edge of the graphical element for processing, wherein the single left edge and the single right edge do not cross or self-intersect each other, wherein the single left edge and the single right edge are different edges of the graphical element and define a region extending from the single left edge to the single right edge that is part of the graphical element to be printed;
   transmitting the at least one processed graphical element to a component of a printing system; and
   printing the at least one processed graphical element.

2. The method of claim 1, wherein processing at least one of the one or more graphical elements comprises describing each of the object edges using one or more vectors.

3. The method of claim 2, wherein describing each of the object edges using one or more vectors comprises, for each object edge described using at least two of the vectors, encoding an endpoint of each subsequent one of the vectors using coordinates relative to an endpoint of an immediately preceding one of the vectors.

4. The method of claim 1, wherein processing at least one of the one or more graphical elements comprises, for at least one of the one or more graphical element for processing, identifying a plurality of breakpoints, wherein each breakpoint corresponds to a position at which either i) two edges of the graphical element cross or ii) an outline of the graphical element self-intersects.

5. The method of claim 1, wherein processing at least one of the one or more graphical elements to encode the at least one graphical element for processing using an edge pair format comprises encoding fewer than all of the graphical elements using the edge pair format.

6. The method of claim 5, further comprising encoding at least one graphical element using a format other than the edge pair format.

7. A system for printing, the system comprising:
   a computing device configured for providing data for printing;
   a printing device coupled to the computing device; and
   at least one computer readable storage medium coupled to at least one of the computing device or the printing device and having processor-executable instructions for printing, the processor-executable instructions when installed onto a system enable the system to perform actions, comprising:
   receiving the data for printing, the data for printing comprising one or more graphical elements;
   processing at least one of the one or more graphical elements to encode the at least one graphical element for processing using an edge pair format, wherein the edge pair format divides the graphical element for processing into a plurality of objects, wherein each object contains a single left edge of the graphical element for processing and a single right edge of the graphical element for processing, wherein the single left edge and the single right edge do not cross or self-intersect each other, wherein the single left edge and the single right edge are different edges of the graphical element and define a region extending from the single left edge to the single right edge that is part of the graphical element to be printed;
   transmitting the at least one processed graphical element to a component of a printing system; and
   printing the at least one processed graphical element.

8. The system of claim 7, wherein processing at least one of the one or more graphical elements to encode the at least one graphical element for processing using an edge pair format comprises encoding fewer than all of the graphical elements using the edge pair format.

9. The system of claim 7, wherein processing at least one of the one or more graphical elements comprises, for at least one of the one or more graphical element for processing, identifying a plurality of breakpoints, wherein each breakpoint corresponds to a position at which either i) two edges of the graphical element cross or ii) an outline of the graphical element self-intersects.

10. A method for printing, the method comprising:
    receiving data for printing, the data for printing comprising one or more graphical elements;
    processing at least one of the one or more graphical elements to encode the at least one graphical element for processing using a run-length encoding (RLE) format, wherein the RLE format divides the processed graphical element into a plurality of scan lines, wherein the RLE format includes an X start position, a Y start position, a length of a first of the plurality of scan lines, and, for each subsequent scan line in the plurality of scan lines, an indication of whether that scan line includes a right edge step relative to the immediately preceding scan line and an indication of whether that scan line includes a left edge step relative to the immediately preceding scan line;
    transmitting the at least one processed graphical element to a component of a printing system; and
    printing the at least one processed graphical element.

11. The method of claim 10, wherein processing at least one of the one or more graphical elements to encode the at least one graphical element for processing using a run-length encoding (RLE) format comprises dividing at least one of the graphical elements for processing into at least two objects for encoding separately in the RLE format.

12. The method of claim 10, wherein lines of the graphical elements for processing using the RLE format comprises edge steps of no more than eight pixels per scan line and wherein processing at least one of the one or more graphical elements to encode the at least one graphical element for processing using the RLE format comprises storing each of the right and left edge steps of the RLE format in a nibble.

13. The method of claim 10, wherein processing at least one of the one or more graphical elements to encode the at least one graphical element for processing using the RLE format comprises dividing the at least one graphical element for processing into one or more trapezoidal objects.

14. The method of claim 13, wherein dividing the at least one graphical element for processing into one or more trapezoidal objects comprises dividing that at least one graphical element into trapezoidal objects in which the left and right edge steps differ by at most one pixel between adjacent scan lines.

15. The method of claim 14, wherein processing at least one of the one or more graphical elements to encode the at least one graphical element for processing using the RLE format further comprises, for a plurality of the trapezoidal objects, categorizing each of these trapezoidal objects into one of four categories: 1) negative left edge steps, negative right edge steps; 2) negative left edge steps, positive right edge steps; 3) positive left edge steps, negative right edge steps; and 4) positive left edge steps, positive right edge steps.

16. The method of claim 15, wherein processing at least one of the one or more graphical elements to encode the at least one graphical element for processing using the RLE format further comprises, for each of the categorized trapezoidal objects, encoding each of the left and right edge steps using a single bit for each scan line.

17. The method of claim 15, wherein processing at least one of the one or more graphical elements to encode the at least one graphical element for processing using the RLE format further comprises, for each of the categorized trapezoidal objects, encoding each of the left and right edge steps using two bits for each edge step.

18. A system for printing, the system comprising:
a computing device configured for providing data for printing;
a printing device coupled to the computing device; and
at least one computer readable storage medium coupled to at least one of the computing device or the printing device and having processor-executable instructions for printing, the processor-executable instructions when installed onto a system enable the system to perform actions, comprising:
receiving data for printing, the data for printing comprising one or more graphical elements;
processing at least one of the one or more graphical elements to encode the at least one graphical element for processing using a run-length encoding (RLE) format, wherein the RLE format divides the processed graphical element into a plurality of scan lines, wherein the RLE format includes an X start position, a Y start position, a length of a first of the plurality of scan lines, and, for each subsequent scan line in the plurality of scan lines, an indication of whether that scan line includes a right edge step relative to the immediately preceding scan line and an indication of whether that scan line includes a left edge step relative to the immediately preceding scan line;
transmitting the at least one processed graphical element to a component of a printing system; and
printing the at least one processed graphical element.

19. The system of claim 18, wherein processing at least one of the one or more graphical elements to encode the at least one graphical element for processing using the RLE format comprises dividing the at least one graphical element for processing into one or more trapezoidal objects.

20. The system of claim 18, wherein lines of the graphical elements for processing using the RLE format comprises edge steps of no more than eight pixels per scan line and wherein processing at least one of the one or more graphical elements to encode the at least one graphical element for processing using the RLE format comprises storing each of the right and left edge steps of the RLE format in a nibble.

* * * * *